Oct. 1, 1940.       F. FERNANDEZ       2,216,365
VEGETABLE PACK
Filed March 13, 1939
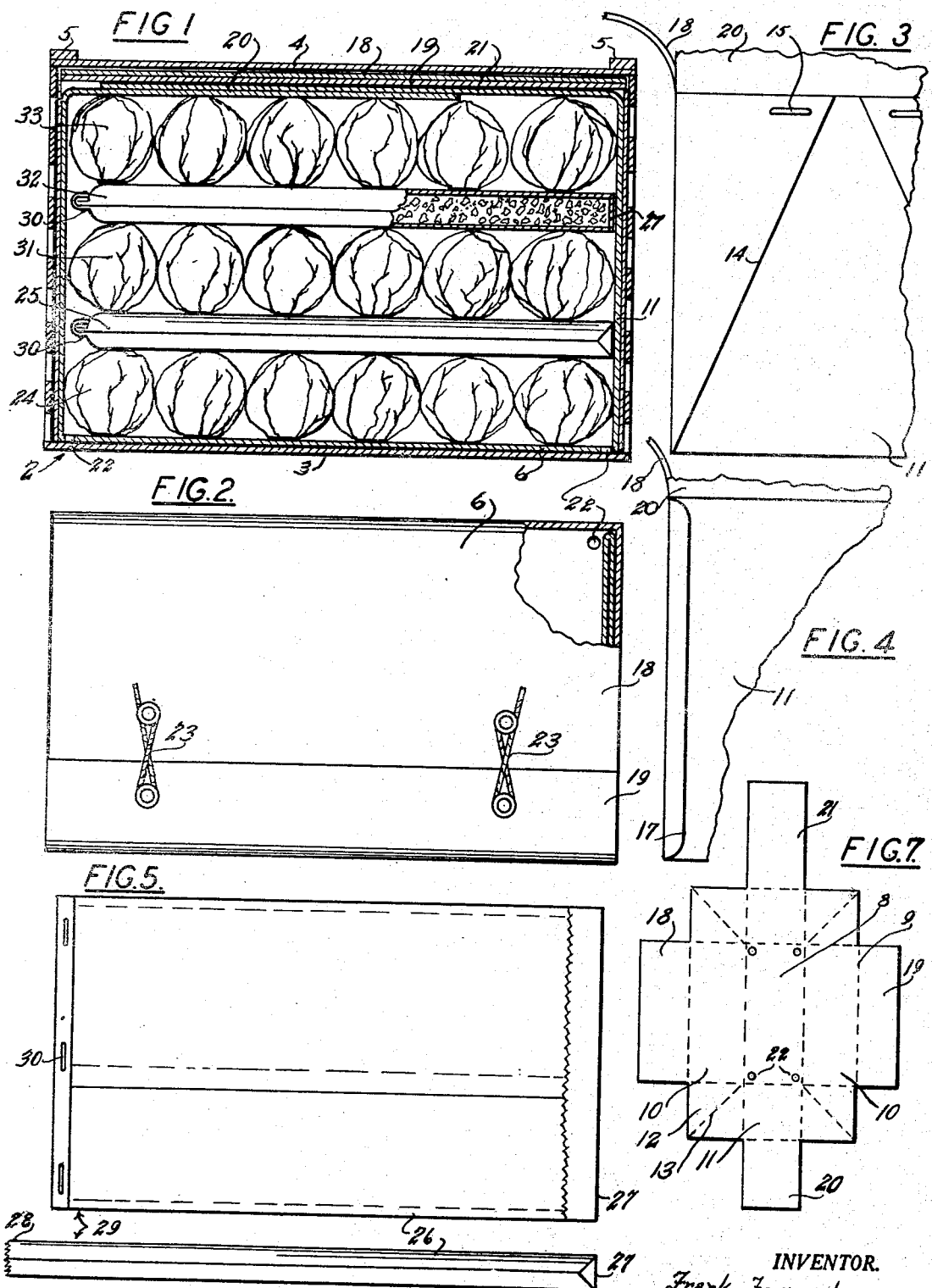
INVENTOR.
Frank Fernandez
BY Scott L. Norvell
ATTORNEY Patented Oct. 1, 1940

2,216,365

UNITED STATES PATENT OFFICE 2,216,365

VEGETABLE PACK

Frank Fernandez, Phoenix, Ariz.

Application March 13, 1939, Serial No. 261,472

3 Claims. (Cl. 62—1)

My invention relates to improvements in vegetable packs used for packing and transporting perishable vegetables, commonly known to the trade as iced vegetables. These vegetables may include head lettuce, cabbage, cauliflower, artichokes, broccoli, or the like, and such other fruits or melons as are adaptable to similar packing methods.

Heretofore, it has been the practice, for the most part, to pack these vegetables in wooden crates or boxes, the sides and ends of which are composed of slats to allow for a certain amount of ventilation. The vegetables are graded as to size and set into these crates in horizontal layers. Between each layer of vegetables, cracked ice was introduced in a sufficient quantity to sift into the spaces between the vegetable heads and in addition form a separating layer approximately two inches thick. After this layer of cracked ice was introduced into the crate, a second layer of vegetables was packed into the crate, and so on until the crate was filled. Thereafter, the top of the crate was closed by a lid composed of slats similar to the sides.

As the business of supplying iced vegetables to distant markets increased, it was found that this method of packing has its drawbacks, some of which may be enumerated as follows:

In order to secure a tight pack it is necessary to force the lid down upon the box with some pressure. This pressure caused the hard particles of ice to be squeezed into and bruise the outer layers and leaves of the vegetables, the bruising caused decay with a subsequent waste and loss. Further, ice introduced into the pack, coming directly from the crusher, has a temperature nearly always below the freezing point. This crushed ice coming into direct contact with the vegetables caused freezing of the outer layers of the vegetables which resulted in quick spoilage and damage, sometimes extending far into the head.

An additional disadvantage has been found in that, while it is desirable to maintain these vegetables in a damp condition, it is also desirable that they do not become saturated with water since water soaked vegetables will not freshen upon removal from the crate, and further, an excess of water induces decay and sliming, with subsequent loss.

Shippers and prior inventors, realizing the above enumerated objects, have sought from time to time to remedy them and various attempts have been made to produce packs which would keep the vegetables from direct contact with the ice to reduce the ill effects of melting ice and excess melt water therefrom. However, these prior attempts have not fully overcome the objections and in view of the foregoing, the objects of my invention are—

First, to provide a vegetable pack, including an outer crate wherein the vegetables are kept out of direct contact with the included ice;

A second object is to provide a vegetable pack wherein the vegetables are completely enclosed within the outer case by a protective covering which is water repellant but not moisture proof;

A third object is to provide a means for enclosing the packed vegetables within an outer crate in thermal relation to cracked ice as a refrigerant but out of contact therewith, and at the same time provide for drainage of excess melt from said ice;

A fourth object is to provide a vegetable pack which can be efficiently and cheaply made to accomplish the results indicated;

A fifth object is to provide such a vegetable pack, as above described, wherein the operations of packing can be efficiently and rapidly performed;

A sixth object is to provide a method of packing iced vegetables wherein the vegetables are maintained at a temperature proper for their preservation without direct contact with pack ice;

A seventh object is to provide a method for packing vegetables whereby they are kept in heat transfer relation but out of contact with packing ice and maintained at a temperature proper for their preservation during transit.

Other objects will appear hereinafter.

I attain the foregoing objects by means of the devices illustrated in the accompanying drawing in which Figure 1 is a side elevation of my improved pack, with the near edge of the pack sectioned off to show the interior; Figure 2 is a plan view of the crate lining; Figure 3 is a fragmentary end view thereof; Figure 4 is a fragmentary end view of a modified form of crate liner construction; Figure 5 is a plan view of my form of ice container; Figure 6 is a side elevation thereof before closing, and Figure 7 is a plan view drawn on a reduced scale of a blank of flat material from which my preferred type of crate liner is formed.

Similar numerals refer to similar parts in the several views.

The outer crate 2, as herewith illustrated, may be of the conventional type, consisting of horizontal slats joined to corner posts to form a box-like structure, including a bottom 3 and the lid 4

4, attached by cleats 5 after the pack is completed.

Within this crate I fit a liner 6, preferably made of water repellant but moisture pervious parchment paper. This material should be of a type which maintains its strength though moist but which is not completely water proofed by waxing, oil coating, or other similar treatment.

In order to provide a complete closure for the vegetables contained within the pack, I prefer to make this liner from one piece of material such as indicated in Figure 7. The base 8 of this liner is positioned in the center of the blank; the dotted lines 9 indicate fold lines from the base, the sides 10 and ends 11 are folded upwardly. The material indicated in the squares 12 between the sides and ends is creased on fold line 13 and then folded across the ends forming flaps 14, which are secured in place by cleated staples 15. When thus folded and bent, a rectangular box-like structure is provided, having the vertical corner edges 16 completely closed and water tight.

Optionally, the squares 12 may be cut from the blank and the contacting edges between the sides and ends secured by a flap 17, Figure 4, joined with water-proof cement to the ends 11.

Extending beyond the sides are two overlapping top flaps 18 and 19, and extending beyond the ends are two overlapping top flaps 20 and 21.

To provide drainage, the bottom 8 of this liner is pierced by holes 22 at each corner. The top flaps adjoining the ends are preferably folded over the pack first. Thereafter, the flaps 18 and 19 attached to the sides are folded over them and secured in place by string and washer connectors 23. However, in some instances this may be reversed.

In practice, these crate liners are prepared in set up form. The ends are then folded inwardly and downwardly to form a flat pack and it is intended that bundles of these flat packs be supplied to the packing sheds.

Upon being received, these liners are opened up and placed within packing crates. A layer of vegetables 24 are then introduced and packed on the bottom of the liner within the crate. Thereinafter, an ice pack 25 is placed on top of this layer of vegetables. This pack is composed of a flat sack-like container 26 made of water repellant but moisture pervious parchment with all joined seams secured by water proof cement. This is preferably fabricated to provide a square end 27 when opened. Crushed ice is introduced at the open end 28 to fill this pack to a point indicated by the arrows 29. Thereupon the open end is folded flat, creased over and secured by cleated staples 30.

After the ice pack 25 is placed within the crate and liner, a second layer of vegetables 31 is packed upon ice pack 25. Following this, a second ice pack 32 is placed upon this second layer of packed vegetables and a third layer of vegetables 33 packed thereon. This process is continued until the crate is filled. Thereupon, the flaps 20 and 21 are folded over the top layer of packed vegetables, as previously described, then the flaps 18 and 19 are folded over, secured by string and washer ties 23, and thereafter the lid 4 is nailed in place.

A pack of this nature does not have to be set on edge or in any particular position to secure proper drainage of water from the melting ice in the ice pack. Whatever water drains into the vegetable compartments is removed through the holes 22, if the crate is packed into the car in a vertical position, or through the top flaps if the pack is inverted. Water produced from the melted ice within the pack is either retained therein or allowed to ooze out through the pervious texture of the ice pack body or may escape at the ends thereof. In any event only a limited amount of water comes directly in contact with the vegetables and in no case does the ice directly impinge upon the vegetable texture. As a result the vegetables are maintained in a chilled condition with sufficient moisture to prevent wilting; at the same time the pack is insulated by the liner, which completely surrounds the contents. Dirt and foreign substances are kept out of the pack but sufficient ventilation and drainage is provided by holes 22, which also allow the escape of gases produced by organic action of the vegetables.

Having now described my invention and explained its use and operation, I claim:

1. A vegetable pack for iced vegetables including, in combination, a crate, a liner set therein composed of water repellant pervious parchment completely enclosing the bottom, sides and ends of the pack, a pack composed of layers of vegetables separated by ice packs composed of sack-like flat containers of water repellant but pervious parchment filled with cracked ice, and means for closing the top of the liner over the top of the pack.

2. A vegetable pack for iced vegetables, including, in combination, a crate, a liner fitted therein composed of pervious parchment having closed seams joining the bottom, sides and ends, foldable, overlapping flaps adapted to form a top closure, and holes in the bottom to provide drainage means for ice melt, and a pack within said liner composed of horizontal layers of vegetables set therein alternated with ice packs consisting of flat sack-like containers composed of pervious parchment completely enclosing horizontal layers of cracked ice.

3. A vegetable pack for iced produce, vegetables, and the like, including, in combination, a crate, a liner fitted within said crate formed of a single blank of pervious parchment paper cut and folded so that the adjoining edges of the bottom, sides, and ends and vertical corner edges thereof consist of folds forming closed seams while the side and end portions of said blank extend beyond the upper edges and ends of said crate to provide overlapping flaps adapted to effect a top closure, the bottom of said liner being provided with drainage holes, and a pack within said liner including crushed iced completely enclosed within pervious parchment paper containers, interspaced between produce packed therein.

FRANK FERNANDEZ.